United States Patent
Suzuki et al.

(10) Patent No.: US 6,303,684 B1
(45) Date of Patent: Oct. 16, 2001

(54) HOT MELT COMPOSITION AND USE THEREOF

(75) Inventors: Yasuhito Suzuki, Tochigi; Mitsuru Sakashita, Oyama; Tomo Iwata, Toda; Ryotaro Nozaki, Toda; Jun-ichi Nakayama, Toda, all of (JP)

(73) Assignee: Asahi Chemical Synthetic Co., Ltd., Tokyo (JP)

( * ) Notice: Subject to any disclaimer, the term of this patent is extended or adjusted under 35 U.S.C. 154(b) by 0 days.

(21) Appl. No.: 09/267,783

(22) Filed: Mar. 15, 1999

(30) Foreign Application Priority Data

Mar. 17, 1998 (JP) .................................................. 10-067253

(51) Int. Cl.$^7$ ...................................................... C08L 25/10

(52) U.S. Cl. ............................ 524/502; 524/529; 524/534

(58) Field of Search ..................................... 524/525, 529, 524/534, 502; 525/316, 241

(56) References Cited

U.S. PATENT DOCUMENTS 4,060,503 * 11/1977 Feeney et al. ........................... 260/5

FOREIGN PATENT DOCUMENTS

WO 93/23472   11/1993   (WO) .
WO 94/18273   8/1994    (WO) .

OTHER PUBLICATIONS

Chemical Abstracts, vol. 122, No. 22, p. 126, (May 29, 1995), Abstract No. 122:267714d.
Chemical Abstracts, vol. 124, No. 26, p. 101, (Jun. 24, 1996), Abstract No. 124:345456d.

* cited by examiner

Primary Examiner—David W. Wu
Assistant Examiner—R. Harlan
(74) Attorney, Agent, or Firm—Armstrong, Westerman, Hattori, McLeland & Naughton, LLP

(57) ABSTRACT

A hot melt composition including 100 parts by weight of a styrene thermoplastic elastomer having an intrinsic viscosity [η] of not less than 1 dl/g and 200 to 3000 parts by weight of a liquid softener selected from process oil, liquid rubber and a modified substance thereof, wherein:

(a) the composition has a softening point measured by ring and ball softening pint method of from 120 to 230° C.;

(b) the composition generates no crack when not less than 75% of a compressive strain is applied under an atmosphere of a temperature of −30 to 40° C.; and (c) the composition does not flow when it is allowed to stand in a load-free state under an atmosphere of a temperature of 100° C. for 24 hours. When the amount of the liquid softener mixed is from 500 to 1200 parts by weight, the composition is particularly useful for industrial sealing material, and when the amount is from 1200 to 3000 parts by weight, the composition is particularly useful for buffer material or vibration isolating material.

9 Claims, No Drawings

HOT MELT COMPOSITION AND USE THEREOF

BACKGROUND OF THE INVENTION

1. Field of the Invention

The present invention relates to a hot melt composition and more particularly to a hot melt composition, which inhibits brittleness at low temperature and fluidity at high temperature and is superior in flexibility, and which has adhesion and easy release to the adherend and also has excellent suitability for buffer material, vibration-isolating material or industrial sealing material.

2. Description of the Prior Art

With recent rapid progress of a polymer synthesis technology, functional plastics and elastomers, which are superior in balance between cost and performance, have been intensively marketed in place of a conventional material in any industrial field.

For example, in the metal substitution filed to which heavy-duty characteristics at high temperature are required, a share of thermoplastics having excellent moldability has rapidly been enlarged, excluding a part of thermosetting resins. On the other hand, in the field of a rubber product, a conventional vulcanized rubber produced by kneading a raw rubber, a reinforcer and a vulcanizing agent and then passing through a step of molding and vulcanization, using much labor and energy is obliged to be withdrawn or isolated from a part of application fields at present because of the advent of a thermoplastic elastomer which can be molded or shaped by using a molding machine for thermoplastics.

Heretofore, various sealing materials have been used to maintain sealing properties of the bonded portion of containers, building structures, various molding machines or the like.

As the sealing material, materials having characteristics such as rubber elasticity are often used, and formerly, molded articles of vulcanized rubber, soft vinyl chloride resin, polyurethane or the like was used. Recently, hot melt type elastomer polymers have been used.

Furthermore, in the application field for sealing material to which rubber-like properties are required at high temperature, cost reduction is not effected, since it is troublesome to fit vulcanized molded articles and synthetic resin foamed articles and it is also difficult to perform automation. Therefore, attempts for practical application of a hot melt type sealing material of a thermoplastic elastomer has gradually been made which can be molten and fit at a job site.

In a conventional hot melt mixing system, since a low-molecular weight or moderate-molecular weigh elastomer is basically used as a base polymer, the shape becomes unstable at high temperature range and fluidization can not be avoided. It is a technical common knowledge to add a compound of wax having a structural viscosity in order to prevent fluidization. However, when wax is added, the flexibility is considerably lowered, resulting in poor balance between the heat resistance and flexibility. Therefore, such an elastomer is not suitable for applications such as sealing material. Since the moderate/low-molecular weight elastomer is used as a base, initial tack is excellent. However, the release properties become poor to cause a problem that it becomes difficult to release from the adherend after use.

In addition, since the molecular weight of the base polymer is low, the softening temperature is low and the heat resistance is poor. When the liquid softener is added to impart the flexibility, mechanical characteristics at high temperature are lowered to cause a phenomenon that fluidization is caused by its own weight in the range at 50° C. or higher or large compressive permanent strain is remained when compressed. These characteristics are not suitable for applications such as sealing material to which sealing properties at higher temperature are required.

In an elastomer hot melt mixing system, process oil is generally added to impart the flexibility. As the amount of the process oil increases, the compressive permanent strain becomes larger. Accordingly, also in this case, a balance between the flexibility and compressive permanent strain is poor and the suitability as the sealing material is lowered.

Even in case of a styrene block copolymer which is considered to have excellent restoring properties among hot melt type systems, sufficient sealing properties can not be maintained, since the polymer having the composition used at present exhibits considerably large compressive permanent strain at high temperature. Therefore, it can not be applied to practical use.

In a hot melt composition using a conventional styrene thermoplastic elastomer, there can be used, as a basic mix, those prepared by using an elastomer having an intrinsic viscosity [η] measured in decalin at 135° C. of less than 1 dl/g as a base and adding a liquid softener such as oil, liquid rubber or the like in the amount of about 20 to 200 parts by weight based on the 100 parts by weight of the elastomer.

As other sealing materials using the elastomer, for example, Japanese Patent Kokai Publication No. 4-110381 discloses a hot melt gasket composition comprising 50 to 100 parts by weight of a reactive elastomer of a carboxyl-modified styrene-ethylene-butylene-styrene block copolymer or a styrene-butadiene-styrene block copolymer, and 50 to 250 parts by weight of a softener comprising a process oil.

This invention discloses as follows. That is, when the amount of the softener is less than 50 parts by weight, the viscosity of the mixture becomes extremely high, resulting in poor machinability and workability. On the other hand, when the amount exceeds 250 parts by weight, the workability and heat resistance become poor.

In the Examples, the followings are specifically described. That is, a styrene block copolymer used as a reactive elastomer is a carboxyl-modified styrene thermoplastic elastomer having an [η] value of 0.67. A composition obtained by mixing a two-fold amount of paraffin oil with this styrene block copolymer and further mixing a synthetic wax, a low-density polyethylene, an ethylene-vinyl acetate copolymer, a nonionic surfactant or silicone oil for releasing as an optional component is superior in close-contact and adhesion to an iron plate.

As described above, an object of the above prior art is to provide a gasket composition for enhancing close adhesion to an iron plate, and the used reactive ethylene monomer is characterized by being a comparatively low-molecular weight styrene block copolymer.

As described above, since the conventional sealing material and caulking material including those of the above prior art use a moderate- or low-molecular weight elastomer as the base, basically, not only the softening point is low and fluidization arises at high temperature, but also the compressive permanent strain, particularly compressive permanent strain at high temperature, is large. Therefore, they are not preferred as the sealing material in view of the suitability.

To prevent fluidization, wax for imparting a structural viscosity has been added. In that case, the flexibility is lowered, resulting in a mix having properties which are brittle and liable to be broken.

Large compressive permanent strain means poor restoring force against loading. Since such a material is plastically deformed in the loaded state, when vibration is applied with a lapse of time, there arises a problem that a gap is gradually formed between the material and a member to be sealed and a good sealed state can not be maintained for a long period.

With recent requirement of recycling of materials and gentleness to global environment, objects for disposal as an industrial waste must be discarded after separating them by the kind of materials as possible. However, it is difficult to separate a gasket adhered firmly onto the adherend such as iron member, like the above prior art. Therefore, the iron member and gasket, which are respectively made of different materials, are discarded as they are without being separated, resulting in one of causes of environmental disruption.

SUMMARY OF THE INVENTION

Hence, it is an object of the present invention to provide a hot melt composition, which exhibits small compressive permanent strain at high temperature and is superior in close adhesion to the adherend, but is easily released from the adherend and suitable for industrial sealing material.

It is another object of the present invention to provide a hot melt composition, which inhibits brittleness at low temperature and fluidity at high temperature and has flexibility.

It is yet another object of the present invention to provide a hot melt composition, which can be applied as an industrial sealing material, buffer material or vibration isolating material, which shows various sealing characteristics according to the amount of the liquid softener and addition of other optional agents to be mixed.

The present invention has been investigated to accomplish the above objects, and it comprises, as a base mix, a hot melt composition characterized by the fact that it is obtained by mixing a specific high-molecular weight styrene thermoplastic elastomer with a large amount of a liquid softener.

The present invention provides a hot melt composition comprising 100 parts by weight of a styrene thermoplastic elastomer having an intrinsic viscosity $[\eta]$ of not less than 1 dl/g and 200 to 3000 parts by weight of a liquid softener selected from process oil, liquid rubber and amodified substance thereof, characterized in that:

(a) said composition has a softening point measured by the ring and ball softening point method from 120 to 230° C.;

(b) said composition generates no crack when not less than 75% of a compressive strain is applied under an atmosphere of the temperature of −30 to 40° C.; and (c) said composition does not flow when it is allowed to stand in a load-free state under an atmosphere of the temperature of 100° C. for 24 hours.

In addition, the present invention provides the hot melt composition as described above, wherein the styrene thermoplastic elastomer is at least one selected from the group consisting of styrene-isoprene-styrene block copolymers, styrene-butadiene-styrene block copolymers and hydrogenation products thereof as well as carboxyl-modified styrene elastomers.

Moreover, the present invention provides the hot melt composition as described above, wherein the amount of the liquid softener mixed is from 300 to 3000 parts by weight based on 100 parts by weight of the styrene thermoplastic elastomer.

Yet, the present invention provides the hot melt composition as described above, wherein the amount of the liquid softener mixed is from 500 to 1200 parts by weight based on 100 parts by weight of the styrene thermoplastic elastomer.

Still, the present invention provides the hot melt composition as described above, wherein the amount of the liquid softener mixed is from 1200 to 3000 parts by weight based on 100 parts by weight of the styrene thermoplastic elastomer.

Yet, the present invention provides the hot melt composition as described above, wherein the melting point is from 130 to 220° C.

Still, the present invention provides the hot melt composition as described above, wherein a rosin and/or petroleum resin tackifier is further added.

Yet, the present invention provides an industrial sealing material using the hot melt composition as described above.

Still, the present invention provides a buffer or vibration-isolating material using the hot melt composition as described above.

DESCRIPTION OF THE PREFERRED EMBODIMENTS

The greatest feature of the present invention lies in use of a styrene elastomer having high molecular weight as a base polymer constituting the hot melt composition, and in mixing of a comparatively large amount of a liquid softener. A technical meaning lies in the respect that a hot melt composition having remarkably strong cohesive force, which has never been obtained by a conventional hot melt composition, could be obtained by the above feature.

The composition of the present invention is remarkably superior in release properties to the adherend when applied to the field of the sealing material because a high-molecular weight elastomer is used as a base. The composition also has a function of easy demolition, capable of easily releasing the sealing material from the adherend, and excellent rubber-like properties at high temperature. These facts are considered to be the grounds for enhanced sealing performances to the adherend.

In the present invention, it is important that the styrene elastomer used as the base polymer has an intrinsic viscosity $[\eta]$ of not less than 1. When $[\eta]$ is not less than 1, not only a single elastomer but also a blend of a plurality of elastomers may be used. The term "intrinsic viscosity $[\eta]$" used in the present invention refers to a value measured in decalin at 135° C.

Selection of this base polymer has a critical meaning decided by extensive studies conducted by the present inventors, and its effect is apparently distinguished from the effect of the styrene elastomer having an intrinsic viscosity $[\eta]$ of less than 1 used as a sealing material.

The styrene thermoplastic elastomer is not particularly limited insofar as it has an intrinsic viscosity $[\eta]$ of not less than 1. Examples thereof include styrene/butadiene block copolymer (S-B), (S-B-S), styrene/isoprene block copolymer (S-I), (S-I-S), styrene/butadiene-isoprene block copolymer (S-B.I), (S-B.I-S), hydrogenated products of these block copolymers, for example, a hydrogenated product of styrene-butadiene-styrene block copolymer (SEBS), a hydrogenated product of styrene-isoprene-styrene block copolymer (SEPS), and hydrogenated product. The styrene block may include copolymer of aromatic vinyl compound, such as one from styrene and α-methylstyrene, in addition to polystyrene.

Among these styrene thermoplastic elastomers, styrene-isoprene-styrene block copolymers, styrene-butadiene-styrene block copolymers and hydrogenated products thereof as well as hydrogenated products are preferably used.

The proportion of the styrene system in these styrene elastomers is from 5 to 70% by weight. When the proportion is from 20 to 40% by weight, a balance between the flexibility at high temperature and rubber elasticity is excellent.

In the present invention, it is important to mix this specific base polymer with a large amount, i.e., 200 to 3000 parts by weight, of the liquid softener. Since the base polymer is a highmolecule, the resulting polymer is superior in characteristics such as sealing characteristics, easy release, buffer property, vibration isolating property and the like.

It is preferred that the hot melt composition of the present invention concurrently has the following physical properties:

(a) a softening point measured by the ring and ball softening point method is from 120 to 230° C.;

(b) no crack arises when not less than 75% of a compressive strain is applied under an atmosphere of the temperature of −30 to 40° C.; and (c) the composition does not flow when it is allowed to stand in a load-free state under an atmosphere of the temperature of 100° C. for 24 hours.

The characteristics as the sealing material vary depending on the amount of the liquid softener, thereby making it possible to provide a sealing material capable of coping with various variations including the kind and shape of the adherend, site of use, and temperature condition.

The sealing material in the present invention means those, which can be suited for all sealing materials such as gasket, packing, sealing, caulking, putty and the like.

The softening point of the hot melt composition of the present invention is from 120 to 230° C., preferably from 130 to 220° C., and particularly from 150 to 200° C. The high temperature suitability of the composition of the present invention depends largely on the molecular weight of the styrene elastomer as the base elastomer. However, these characteristics depend exclusively on how a styrene domain constituting a skeleton of a matrix can tolerate the load applied from the outside. When the molecular weight of the polystyrene constituting the styrene domain is low, attack on the domain by a large amount of the liquid softener proceeds and the heat resistance is lowered. Accordingly, it is impossible to secure the heat resistance only by the molecular weight of the elastomer, and the thermal properties are decided by the liquid softener and elastomer.

In general, when the amount of the liquid softener added is increased, the flexibility is enhanced, however, the softening point is lowered and the heat resistance is deteriorated. On the other hand, when the amount of the liquid softener added is decreased, the softening point is raised and the high temperature characteristics are improved, however, the resulting composition is liable to become brittle at normal temperature and low temperature.

The ring and ball method is a method of measuring the softening point according to JAI-17-1991.

Regarding the sealing material of the present invention, it is necessary that no crack arises when not less than 75% of a compressive strain is applied under an atmosphere of the temperature of −30 to 40° C. This compressive permanent strain means that no crack arises at the time when a load is released under this condition immediately after compression. If no crack arises even under such condition, a sealing material having high sealing properties can be obtained.

It is important that the sealing material of the present invention does not flow when it is allowed to stand in a load-free state under an atmosphere of the temperature of 100° C. for 24 hours. This provision is important for providing accurate setting as the sealing material even if the adherend is placed under high temperature. A sealing material which flows under an atmosphere at 100° C. is not suitable to perform a sealing material fitting operation under a high temperature atmosphere.

In the present invention, the liquid softener to be mixed with styrene elastomer include, for example, at least one selected from the group consisting of process oil, liquid rubber and modified substances thereof. In order to preferably accomplish the object of the present invention, there can be used process oils such as paraffin oil, naphthene oil, aromatic oil and the like; or liquid rubbers such as liquid polyisoprene, liquid polybutadiene, liquid polybutene, liquid 1,2-polybutadiene, liquid styrene-butadiene rubber, maleic polybutadiene, terminal hydroxyl group-containing polybutadiene, maleic polybutene and the like, alone or in combination thereof.

It is possible to use components, which can be normally used as the liquid tackifier, such as rosin ester, modified rosin ester, terpene oligomer, modified terpene oligomer, $C_5$ liquid petroleum resin, $C_5$–$C_9$ liquid petroleum resin and the like, as the liquid softener of the present invention. When using this liquid tackifier, the adhesion to the adherend is further improved and it becomes difficult to release from the adherend after use. Accordingly, this tackifier may not be used for application to which easy release is required.

The amount of the liquid softener to be mixed varies depending on the kind and state of the adherend. In order to accomplish the object of the present invention, i.e. excellent adhesion and excellent release from the adherend, the liquid softener is mixed in the amount within the range from 200 to 3000 parts by weight based on 100 parts by weight of the styrene elastomer. The sealing characteristics of the hot melt composition obtained vary depending upon the mixing amount of the liquid softener. That is, as the amount of the liquid softener increases, the flexibility of the composition is generally enhanced and the adhesion to the adherend is improved. It should be understood, however, that the reason why the composition of the present invention exhibits excellent sealing characteristics at high temperature is as follows. That is, since not only the sealing material becomes soft but also the high temperature impact resilience has been large for a long period of time, the pressure of the contact surface between the adherend and sealing material is always maintained at high level.

In fact, as will be apparent from the Examples described hereinafter, it can be understood that there is the range having excellent balance between the amount of the liquid softener and impact resilience.

In the present invention, the composition becomes useful as the sealing material, buffer material and vibration isolating material, by mixing the liquid softener in the amount of 200 to 3000 parts by weight based on 100 parts by weight of the styrene thermoplastic elastomer. Particularly, when the liquid softener is mixed in the amount of 500 to 1200 parts by weight based on 100 parts by weight of the styrene thermoplastic elastomer, the balance between the compressive permanent strain at high temperature and rubber-like impact resilience is excellent as the characteristics of the sealing material. When the liquid softener is mixed in the amount of 1300 to 3000 parts by weight based on 100 parts by weight of the styrene thermoplastic elastomer, the resulting sealing material becomes soft and the compressive stress is considerably lowered, however, the shape retention is excellent and fluidization does not occur. Consequently, functions such as buffer property and vibration isolating property are exhibited.

When the amount of the liquid softener is from 1300 to 3000 parts by weight, there is a mixing range having remarkable flexibility enough to exhibit very low compressive stress value of not more than 0.1 kg/cm² under 50% compression at normal temperature, and shape retention enough to cause little compressive permanent strain at normal temperature. These characteristics are suitable for hot melt type buffer material and vibration isolating material.

Since the base polymer of the present invention has a molecular weight higher than that of a base polymer of a conventional hot melt composition, it is basically superior in heat resistance as amatter of course. Surprisingly, it has also been found that, even if the flexibility is imparted by adding much amount of the liquid softener, not only mechanical characteristics at high temperature, particularly compressive permanent strain is not increased, but also a remarkably low value is exhibited in a certain range of adding amount.

The reason is assumed that a matrix having interlocked high-molecular weight elastomer molecules embraces a large amount of the low-molecular weight liquid softener, thereby to develop characteristics which can not be understood by extension of the conventional concept.

Anyway, it is apparent that the above specified hot melt composition of the present invention is a material having remarkably excellent high-temperature sealing function by maintaining the rubber-like impact resilience even at high temperature, and has excellent suitability as the industrial material.

Examples of the buffer material include semi-liquid one such as gel and solid one such as reactive foam or reactive type one. The mix of the present invention has the following merits. That is, it is not necessary to place in a container because it is a solid hot melt. Since an aging time is a cooling time, the working time can be reduced in comparison with the reactive type one. Furthermore, since it is a hot melt, the hot melt is molten and formed into an arbitrary shape at a job site.

As described above, the hot melt composition of the present invention is superior in capability of retaining the liquid softener because the base polymer has high molecular weight. Therefore, it becomes possible to retain the solid state even if a large amount of the liquid softener is added. Also, the hot melt composition of the present invention can exhibit the flexibility, which is not recognized in a conventional hot melt composition.

In case of the base polymer composition wherein [η] is less than 1.0, it is difficult to retain the solid state when the amount of the softener added is within the above range. Even if the solid state can be obtained, compressive permanent strain at high temperature is large and the shape retention is poor. Therefore, it can not be used as the buffer material or vibration isolating material like the present invention.

In order to further improve the adhesion, tackifiers can be added to the hot melt composition of the present invention. As the tackifier, there can be used tackifiers known per se such as alicyclic hydrogenated tackifier, rosin, modified rosin, esterified products thereof, aliphatic petroleum resin, alicylic petroleum resin, aromatic petroleum resin, a copolymerized petroleum resin of an aliphatic component and an aromatic component, low-molecular weight styrene resin, isoprene resin, alkylphenol resin, terpene resin, coumaron-indene resin and the like without any limitation. Among them, rosin and/or petroleum resin tackifiers are preferably used.

It is possible to mix modifiers such as polyolefin wax and the like, inorganic and/or organic fillers, or additives such as pigments, stabilizers and the like as far as the object of the present invention is not adversely affected.

Examples of the wax include paraffin wax, microcrystalline wax, polyethylene wax, polypropylene wax, Fisher-Tropsh wax, polyethylene oxide wax, meleic polyethylene wax and modified products thereof.

Examples of the thermoplastic elastomer and thermoplastic resin include styrene-butadiene rubber, ethylene-propylene rubber, butyl rubber, acrylic rubber, ethylene-vinyl acetate copolymer, polyethylene, polypropylene, polystyrene, polybutene, polybutadiene and the like.

Examples of the inorganic filler include calcium carbonate, zinc oxide, glass beads, titanium oxide, alumina, carbon black, clay, ferrite, talc, mica powder, aerogyl, silca, inorganic fiber such as glass fiber, inorganic foam and the like.

Examples of the organic filler include powder of thermosetting resin such as epoxy resin, carbon fiber, synthetic fiber, synthetic pulp and the like.

Examples of the stabilizer include phenolic antioxidant, phosphorus antioxidant, benzotriazole ultraviolet absorber, benzophenone ultraviolet absorber, hindered amine radical scavenger and the like.

EXAMPLES

The following Examples further illustrate the present invention but are not to be construed to limit the scope thereof.

Production of test pieces in the Examples and Comparative Examples as well as evaluation of physical properties of hot melt compositions were performed according to the following methods.

<Method of measuring softening point>

This was measured according to JAI-17-1991.

<Method of producing compression test piece>

A cylinder having a height of 20 mm and a diameter of 27 mm was molded from the resulting hot melt composition and was used as a compression test piece.

<Method of evaluating crack under compression>

Using an accurate universal testing machine equipped with a constant temperature bath (Autograph AG-2000C, manufactured by Shimadz Seisakusho Co.), a compression test piece was compressed in the height direction by 75% at a compression rate of 50 mm/min in a measuring atmosphere at −30 and 40° C., and then released immediately. It was visually observed whether crack occurs or not. The evaluation was performed by the following criteria. ○: No crack was observed; X: Crack was observed.

<50% compressive stress>

The test piece was compressed in the same manner as that of the method of evaluating crack under compression, and the compressive stress at this time was measured. Stress/Sectional area=Compressive stress (kg/cm²).

<50% compressive strain>

The same test piece as described above was compressed by 50% (compressed from 20 mm to 10 mm) and allowed to stand at 80° C. for 24 hours. After standing, the test piece was released and the height after 22 hours was measured. Permanent strain was measured by the following calculating equation.

$$\text{Permanent strain} = \frac{20 \text{ mm} - \text{measured height (mm)}}{10 \text{ mm}} \times 100$$

<Method of evaluating fluidity under unloaded state>

The same test piece as that of the compression test specimen was allowed to stand under an unloaded state in a constant temperature bath at an atmospheric temperature of 100° C. for 24 hours so that the height direction of the test piece is perpendicular to the horizontal surface. After standing, the test piece was removed and then the fluidity was evaluated by the following criteria. ○: No fluidity, that is, the case where a projected area of the bottom surface of the test piece is less than 10% of that before standing; X: With fluidity, that is, the case where a projected area of the bottom surface of the test piece is not less than 10% of that before standing.

<Water tightness>

A hot melt composition was applied on the glass surface in the form of a circle (bead having a width of about 1 cm and a height of about 0.3 cm) and was dipped in water at 80° C. and allowed to stand for 10 days in the state of being compressed by 50% between the glass plate and another glass plate. Then, it was confirmed whether water penetrates or not. The evaluation was performed by the following criteria. ○: Penetration of water was not observed; X: Penetration of water was observed.

<Example 1>

To 200 parts by weight of SEPS (referred to as Elastomer a) having [η] of 1.46 as a styrene elastomer, 600 parts by weight of "Diana Process Oil PW-90" (manufactured by Idemitsu Kosan Co. Ltd.) and the mixture was charged in a 1 liter twin-arm type kneader manufactured by Moriyama Co. (model SVI-1GH-E). After kneading at 52 rpm at 200° C. for 1 hour, about 800 g of a hot melt composition was obtained.

The physical properties of the resulting hot melt composition are shown in Table 1.

<Example 2>

According to the same manner as that described in Example 1 except for changing the amount of the styrene elastomer in Example 1 to 100 parts by weight and changing the amount of the liquid softener ("Diana Process Oil PW-90") to 500 parts by weight, about 600 g of a hot melt composition was obtained. The physical properties of the resulting hot melt-composition are shown in Table 1.

<Example 3>

According to the same manner as that described in Example 2 except for using 100 g of SEPS (referred to as Elastomer b) having [η] of 1.26 as the styrene elastomer, about 600 g of a hot melt composition was obtained. The physical properties of the resulting hot melt composition are shown in Table 1.

<Comparative Example 1>

According to the same manner as that described in Example 1 except for using 200 g of SEBS (referred to as Elastomer c) having [η] of 0.59 as the styrene elastomer, a hot melt composition was obtained.

The physical properties of the resulting hot melt composition are shown in Table 1.

<Comparative Example 2>

According to the same manner as that described in Example 2 except for using 100 g of Elastomer c having [η] of 0.59 as the styrene elastomer, a hot melt composition was obtained. The physical properties of the resulting hot melt composition are shown in Table 1.

<Examples 4 to 5 and Comparative Examples 3 to 5>

As Examples, hot melt compositions were obtained according to the same manner as that described in Example 1 except for increasing the amount of the liquid softener to be mixed with 100 parts by weight of the styrene elastomer to 600 parts by weight, 800 parts by weight and 1000 parts by weight, respectively. The respective physical properties of the resulting compositions were determined and are shown in Table 2.

As Comparative Examples, the respective physical properties were determined for the cases in which the procedure in Comparative Example 1 was repeated except that the amount of the liquid softener was changed in the same manner as above. The results are also shown in Table 2.

<Examples 7 to 9 and Comparative Examples 6 to 8>

As Examples, hot melt compositions were obtained according to the same manner as that described in Example 1 except for increasing the amount of the liquid softener to be mixed with 100 parts by weight of the styrene elastomer to 1500 parts by weight, 2000 parts by weight and 3000 parts by weight, respectively. The respective physical properties of the resulting compositions were determined and are shown in Table 3.

As Comparative Examples, the respective physical properties were determined for the cases in which the procedure in Comparative Example 1 was repeated except that the amount of the liquid softener was changed in the same manner as above. The results are also shown in Table 3.

<Example 10 and Comparative Example 9>

According to the same manner as that described in Example 1 except for mixing an elastomer mixture having [η] of 1.08, which is obtained by mixing 50 parts by weight of Elastomer a having [η] of 1.46 with 50 parts by weight of a carboxyl-modified styrene thermoplastic elastomer (referred to as Elastomer d) having [η] of 0.67, with 700 parts by weight of a liquid softener, a hot melt composition was obtained. The respective physical properties of the resulting composition were determined and are shown in Table 4.

As Comparative Examples, the respective physical properties were determined for the cases in which Elastomer c as above was mixed with 700 parts by weight of a liquid softener. The results are also shown in Table 4.

The adhesion to an iron plate was determined in the following manner. A hot melt composition was bead-applied from a hand gun at 200° C. on an iron plate having a width of 25 mm in a coating thickness of 3 mm and a coating width of 6 mm. After cooling to 20° C., the bead was peeled off by hand and the adhesion was evaluated by scores ⊚ and ○.

As is apparent from Table 4, it was confirmed that the compositions of the invention were superior in adhesion to the iron plate as described in Examples above, exhibited small compressive permanent strain and were superior in sealing characteristics. To the contrary, the compositions of the Comparative Examples were superior in adhesion to the iron plate, but exhibited large compressive permanent strain and were inferior in sealing characteristics.

Although not shown in Tables, all the hot melt compositions obtained in Examples were superior in easy release property from the adherend.

TABLE 1

|  | Component to be mixed | [η] | Example 1 | Example 2 | Example 3 | Comparative example 1 | Comparative example 2 |
|---|---|---|---|---|---|---|---|
| Amount (g) | Elastomer a | 1.46 | 200 | 100 | | | |
|  | Elastomer b | 1.26 | | | 100 | | |
|  | Elastomer c | 0.59 | | | | 200 | 100 |
|  | Process oil PW-90 | | 600 | 500 | 500 | 600 | 500 |
| Physical properties | Ring and ball softening point (° C.) | | 180 or more | 177 | 185 | 107 | 97 |
|  | Crack at the time of 75% compression | 40° C. | ○ | ○ | ○ | ○ | ○ |
|  |  | −30° C. | ○ | ○ | ○ | x | ○ |
|  | Fluidity (24 hours) | 100° C. | ○ | ○ | ○ | x | x |
|  | 50% Compressive stress (kg/cm²) | 20° C. | 0.8 | 0.4 | 0.2 | 2.4 | 1.2 |
|  | Permanent strain obtained after applying 50% compression (for 24 hours) and allowing to stand at 20° C. for 22 hours | 50° C. | 45 | 30 | 100 | 100 | |
|  |  | 80° C. | 80 | 80 | 75 | 100 | 100 |
|  | Water tightness | 80° C. | ○ | ○ | ○ | x | x |

TABLE 2

|  | Component to be mixed | [η] | Example 4 | Example 5 | Example 6 | Comparative example 3 | Comparative example 4 | Comparative example 5 |
|---|---|---|---|---|---|---|---|---|
| Amount (g) | Elastomer a | 1.46 | 100 | 100 | 100 | 100 | 100 | |
|  | Elastomer c | 0.59 | | | | | | 100 |
|  | Process oil PW-90 | | 600 | 800 | 1000 | 30 | 150 | 800 |
| Physical | Ring and ball softening point (° C.) | | 185 | 150 | 135 | 220 or more | 220 or more | 90 |
|  | Crack at the time of 75% compression | 40° C. | ○ | ○ | ○ | ○ | ○ | ○ |
|  |  | −30° C. | ○ | ○ | ○ | x | x | x |
|  | Fluidity (24 hours) | 100° C. | ○ | ○ | ○ | ○ | ○ | x |
|  | 50% Compressive stress (kg/cm²) | 20° C. | 0.3 | 0.2 | 0.1 | 20.0 | 2.0 | 0.4 |
|  | Permanent strain obtained after applying 50% compression (for 24 hours) and allowing to stand at 20° C. for 22 hours | 50° C. | 40 | 30 | 20 | 70 | 60 | 100 |
|  |  | 80° C. | 75 | 70 | 50 | 95 | 90 | 100 |
|  | Water tightness | 80° C. | ○ | ○ | ○ | x | x | x |

TABLE 3

|  | Component to be mixed | [η] | Example 7 | Example 8 | Example 9 | Comparative example 6 | Comparative example 7 | Comparative example 8 |
|---|---|---|---|---|---|---|---|---|
| Amount (g) | Elastomer a | 1.46 | 100 | 100 | 100 | | | |
|  | Elastomer c | 0.59 | | | | 100 | 100 | 100 |
|  | Process oil PW-90 | | 1500 | 2000 | 3000 | 1500 | 2000 | 3000 |
| Physical properties | Ring and ball softening point (° C.) | | 140 | 120 | 120 | Impossible to measure | Impossible to measure | Impossible to measure |
|  | Crack at the time of 75% compression | 40° C. | ○ | ○ | ○ | ○ | ○ | ○ |
|  |  | −30° C. | ○ | ○ | ○ | ○ | ○ | ○ |
|  | Fluidity (24 hours) | 100° C. | ○ | ○ | ○ | x | x | x |
|  | 50% Compressive stress (kg/cm²) | 20° C. | 0.03 | 0.04 | 0.05 | Impossible to measure | Impossible to measure | Impossible to measure |
|  | Permanent strain obtained after applying 50% compression (for 24 hours) and allowing to stand at 20° C. for 22 hours | 50° C. | 20 | 15 | 15 | Impossible to measure | Impossible to measure | Impossible to measure |
|  |  | 80° C. | 40 | 35 | 30 | Impossible to measure | Impossible to measure | Impossible to measure |

*Impossible to measure because of being in liquid state

TABLE 4

| | Component to be mixed | [η] | Example 10 | Comparative example 9 |
|---|---|---|---|---|
| Amount (g) | Elastomer a | 1.46 | 50 | |
| | Elastomer d | 0.67 | 50 | 100 |
| | Process oil PW-90 | | 700 | 700 |
| Physical properties | Ring and ball softening point (° C.) | | 140 | 100 |
| | Crack at the time of 75% compression | 40° C. | ○ | ○ |
| | | −30° C. | ○ | ○ |
| | Fluidity (24 hours) | 100° C. | ○ | ○ |
| | 50% Compressive stress (kg/cm$^2$) | 20° C. | 0.27 | 0.31 |
| | Permanent strain obtained after applying 50% compression (for 24 hours) and allowing to stand at 20° C. for 22 hours | 50° C. | 40 | 100 |
| | | 80° C. | 75 | 100 |
| | Adhesion to iron plate | 20° C. | ○ | ◎ |

According to the present invention, there is provided a hot melt composition which is superior in close adhesion to the adhered but is easily released from the adhered. This hot melt composition is suitable for applications such as industrial sealing material, buffer material, vibration isolating material and the like, depending on the amount of the liquid softener mixed, and is particularly superior in sealing characteristics under high temperature condition.

What is claimed is:

1. A hot melt composition comprising 100 parts by weight of a styrene thermoplastic elastomer having an intrinsic viscosity [η] of not less than 1 dl/g and 200 to 3000 parts by weight of a liquid softener selected from process oil, liquid rubber and a modified substance thereof, wherein:

(a) said composition has a softening point measured by ring and ball softening point method from 120 to 230° C.;

(b) said composition generates no crack when not less than 75% of a compressive strain is applied under an atmosphere of a temperature of −30 to 40° C.; and (c) said composition does not flow when it is allowed to stand in a load-free state under an atmosphere of a temperature of 100° C. for 24 hours.

2. The hot melt composition according to claim 1, wherein the styrene thermoplastic elastomer is at least one selected from the group consisting of styrene-isoprene-styrene block copolymers, styrene-butadiene-styrene block copolymers and hydrogenation products thereof as well as carboxyl-modified styrene elastomers.

3. The hot melt composition according to claim 1 or 2, wherein the amount of the liquid softener mixed is from 300 to 3000 parts by weight based on 100 parts by weight of the styrene thermoplastic elastomer.

4. The hot melt composition according to claim 1 or 2, wherein the amount of the liquid softener mixed is from 500 to 1200 parts by weight based on 100 parts by weight of the styrene thermoplastic elastomer.

5. The hot melt composition according to claim 1 or 2, wherein the amount of the liquid softener mixed is from 1200 to 3000 parts by weight based on 100 parts by weight of the styrene thermoplastic elastomer.

6. The hot melt composition according to claim 1 or 3, wherein a melting point is from 130 to 220° C.

7. The hot melt composition according to claim 1 or 2, wherein a rosin and/or petroleum resin tackifier is further added.

8. The hot melt composition according to claim 1 or 2, wherein the hot melt composition is used as an industrial sealing material.

9. The hot melt composition according to claim 1 or 2, wherein the hot melt composition is used as a buffer or vibration-isolating material.

* * * * *